United States Patent
Chang et al.

(10) Patent No.: US 11,868,481 B2
(45) Date of Patent: Jan. 9, 2024

(54) METHOD FOR DISCOVERING VULNERABILITIES OF OPERATING SYSTEM ACCESS CONTROL MECHANISM BASED ON MODEL CHECKING

(71) Applicant: ZHEJIANG UNIVERSITY, Hangzhou (CN)

(72) Inventors: Rui Chang, Hangzhou (CN); Zhuoruo Zhang, Hangzhou (CN); Shaoping Pan, Hangzhou (CN); Kui Ren, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 157 days.

(21) Appl. No.: 17/386,494

(22) Filed: Jul. 27, 2021

(65) Prior Publication Data

US 2022/0083668 A1    Mar. 17, 2022

Related U.S. Application Data

(63) Continuation of application No. PCT/CN2020/115227, filed on Sep. 15, 2020.

(30) Foreign Application Priority Data

Sep. 14, 2020    (CN) .................. 202010961713.X

(51) Int. Cl.
*G06F 21/57* (2013.01)
*G06F 21/55* (2013.01)
*G06F 21/60* (2013.01)

(52) U.S. Cl.
CPC .......... *G06F 21/577* (2013.01); *G06F 21/554* (2013.01); *G06F 21/575* (2013.01); *G06F 21/604* (2013.01)

(58) Field of Classification Search
CPC .... G06F 21/577; G06F 21/554; G06F 21/575; G06F 21/604
See application file for complete search history.

(56) References Cited

U.S. PATENT DOCUMENTS

2012/0110671 A1*   5/2012   Beresnevichiene ....... G06F 8/10
                                                    726/25
2018/0322288 A1*  11/2018   Jabbour .................. G06F 21/57
(Continued)

FOREIGN PATENT DOCUMENTS

| CN | 102136047 A | 7/2011 |
| CN | 106708730 A | 5/2017 |
| CN | 109918049 A | 6/2019 |

OTHER PUBLICATIONS

International Search Report (PCT/CN2020/115227); dated May 26, 2021.
(Continued)

*Primary Examiner* — Farid Homayounmehr
*Assistant Examiner* — Suman Debnath
(74) *Attorney, Agent, or Firm* — W&G Law Group

(57) ABSTRACT

This invention discloses a method for discovering vulnerabilities of operating system access control based on model checking. In this method, security attribute and security specifications of operating system access control module are analyzed to construct the access control model. To discover vulnerabilities in the model, security analysis is performed for access control functionality with theorem proving techniques, and consistency of abstract machine specification and correctness and completeness of the components are verified with model checking tools. This method provides theoretical and technical support for studies in the field of operating system security.

3 Claims, 4 Drawing Sheets

(56) References Cited

U.S. PATENT DOCUMENTS

2018/0351806 A1    12/2018  Mohanram et al.
2019/0327271 A1*   10/2019  Saxena .................... G06N 3/08
2020/0274898 A1*    8/2020  Xie ........................ G06F 21/53

OTHER PUBLICATIONS

"Review on Vulnerability Analysis and Vulnerability Mining Technology of Industrial Control System"(Jun. 30, 2020) [LAI Yingxu et al.].

* cited by examiner

METHOD FOR DISCOVERING VULNERABILITIES OF OPERATING SYSTEM ACCESS CONTROL MECHANISM BASED ON MODEL CHECKING

TECHNICAL FIELD

The present disclosure relates to the field of vulnerability discovery for access control of an operating system, in particular to a method for discovering vulnerabilities of access control of an operating system based on model checking.

BACKGROUND

An operating system uses various access control mechanism for system protection, but there are still many security vulnerabilities in access control granularity and authorization management, such as privilege escalation and privilege leakage. In recent years, efforts have been made to help deal with various security threats and vulnerability exploit attacks. However, the current severe system fragmentation problem limits the application scope of access control solutions relying on system version. Furthermore, according to theoretical analysis and verification, the certainty of its security strategy is difficult to guarantee, and therefore the completeness and correctness of the rules cannot be guaranteed. While some existing work use formal method to analyze system vulnerabilities, most of them have a high level of abstraction and lack practical applications in real systems.

SUMMARY

This invention aims to provide a method for discovering vulnerabilities of operating system access control mechanism based on model checking.

Specifically, the method includes the following steps:
Step 1: analyzing the security requirements of operating system access control module and formalizing access control rules and security attributes to describe the security attribute specification; and providing a strictly defined security specification by analyzing the program semantics and system dynamic behaviors, to describe the specification of operating system access control at a high level;
Step 2: formally abstracting the access control module of the operating system, defining the basic abstract machines and its elements, analyzing and reasoning about the formal specification, determining the static and dynamic properties, and refining the abstract specification in a stepwise manner by adding more details and keeping the semantics unchanged, to construct the access control model closer to reality in an incremental manner;
Step 3: using theorem proving tools to automatically or interactively prove the proof obligations of the access control model to ensure the internal consistency of the abstract machines in the specification initialization, reasoning and refinement implementation stages, to analyze the security of the access control model based on the proof results;
Step 4: aiming at possible access rule conflicts in a security specification of the access control model, choosing reasonable verification methods and rules of the model checking tools to perform state space exploration or fixed point calculation, and checking whether there is any invariant violation;
Step 5: based on the security analysis of the access control model in Step 3 and the model checking results in Step 4, simulating the actual attack scenario, and detecting the security risks and vulnerabilities of access control.

Furthermore, in Step 3, the step of automatically and interactively proving proof obligations of the access control model with theorem proving tools is performed as follows: a connection between an abstract mathematical structure and a concrete computer representation is established, a relation between the abstract specifications and refined specifications is established, and different proof strategies are used to prove them.

Furthermore, the static and dynamic properties in Step 2 include consistency, integrity and state change properties at runtime.

Furthermore, the security attributes in Step 1 include atomic security attributes and resource security attributes, and the atomic security attributes include privilege definition, access location and user type; the resource security attributes include subject security attributes and object security attributes.

The present disclosure has the following beneficial effects.

The present invention conducts research on operating system access control mechanism based on formal method. Specifically, this method analyzes access control security attributes, formalizes abstract access control module, refines the access control models in a stepwise manner, and detects possible access conflicts in the access control models by model checking tools. Potential security risks and vulnerabilities of the access control module are detected by exploring its state space. Overall, this method explores the vulnerabilities of access control mechanism based on model checking, and provides a theoretical and generic method for security verification and security reinforcement of an operating system.

DESCRIPTION OF EMBODIMENTS

The purpose and effect of the present disclosure will become clearer by describing the present disclosure in detail corresponding to the drawings and preferred embodiments. The specific embodiments described here are only used to explain the present disclosure, and the present disclosure is not limited to this scenario.

Figure 1:
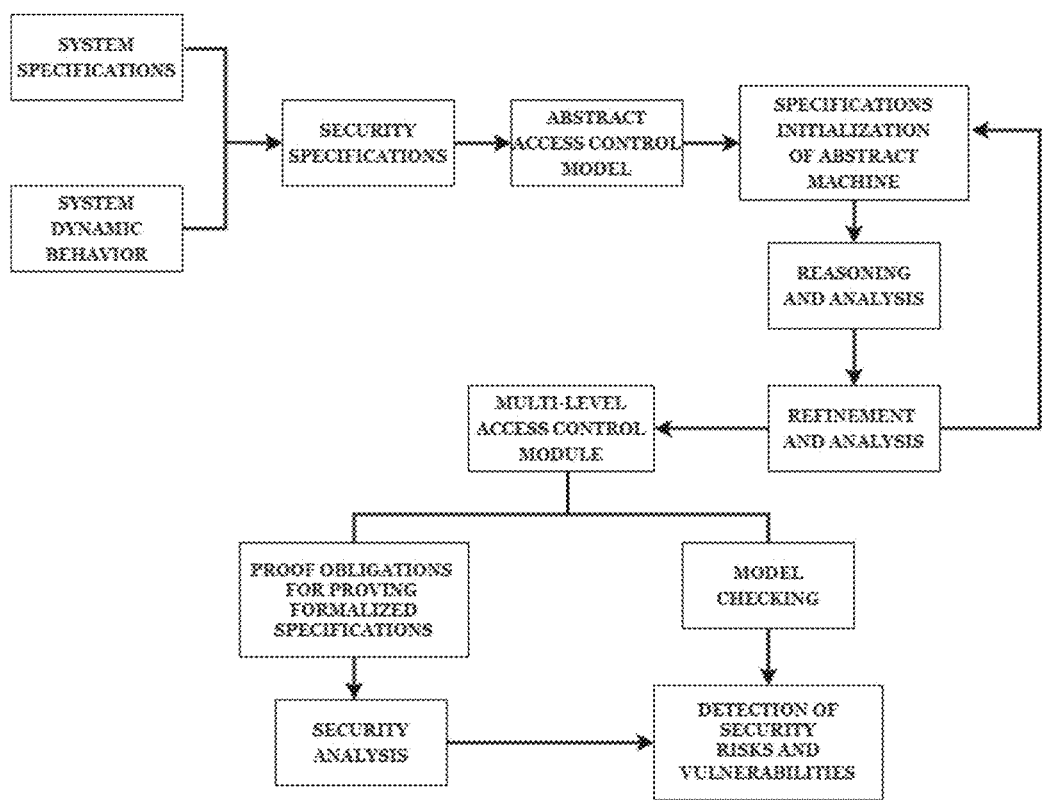
FIG. 1 is a flowchart illustrating the method for discover vulnerabilities of operating system access control module.

As shown in FIG. 1, the method for discovering vulnerabilities of operating system access control module based on model checking includes the Steps 1-5 as described below.

Step 1: the security requirements of operating system access control module are analyzed and access control rules and security attributes are formalized to describe the security attribute specification. Then, a strictly defined security specification is provided by analyzing the program semantics and system dynamic behaviors. Therefore, the specification of operating system access control is described at a high level.

Step 2: the access control module of the operating system is formally abstracted, the basic abstract machines and its elements are defined, the formal specification is analyzed and reasoned about, and the static and dynamic properties is determined. As one of the embodiments, static and dynamic properties include consistency, integrity and state change properties at runtime. The static properties of the system are described as invariants, and the dynamic properties are described as operation specification. Then, the abstract specification is refined in a stepwise manner by adding more details and keeping the semantics unchanged. Thus, the access control model closer to reality is constructed in an incremental manner.

Step 3: theorem proving tools are used to automatically or interactively prove the proof obligations of the access control model to ensure the internal consistency of the abstract machines in the specification initialization, reasoning and refinement implementation stages. Therefore, the security of the access control model is analyzed based on the proof results.

As one of the embodiments, the proof obligations of the multi-level access control model are interactively proved by using a theorem proving tool as follows: a connection between an abstract mathematical structure and a concrete computer representation is established, a relation between the abstract specifications and refined specifications is established is established, and different proof strategies are used to prove them.

Step 4: aiming at possible access rule conflicts in a security specification of the access control model, reasonable verification methods and rules of the model checking tools are chosen to perform state space exploration or fixed point calculation, and whether there is invariant violation is checked.

Step 5: based on the security analysis of the access control model in Step 3 and the model checking results in Step 4, the actual attack scenario is simulated, and the security risks and vulnerabilities of access control are detected.

A specific embodiment of the method according to the present disclosure is given below. The embodiment is an ARM-Android access control vulnerability discovery process based on model checking.

Step 1: the access control mechanism of an ARM platform based on TrustZone isolation mechanism is analyzed to instantiate basic access control rules and security attributes. Users, roles and type identifiers are included in the context, processes are the subjects, and resources are the objects.

Step 2: three basic elements in the formalized model, i.e., processes, resources and access control files, are abstracted to three basic abstract machines TZ_Proc, TZ_Res and TZ_Policy, respectively. The abstract machine defines the states, encapsulates the basic entities and their attributes, and provides main operations. Based on the three abstract machines and formal description of processes' access to the resources, the access control model TZ_Sys is established and refined in a stepwise manner.

Step 3: the tool Atelier B is used to perform type checking and theorem proving against the access control model. Based on automatic proof, the proof rate of the 21 proof obligations in TZ_Proc is 100%, the proof rate of the 46 proof obligations in TZ_Res is 85%, the proof rate of the 7 proof obligations in TZ_Policy is 100%, and the proof rate of the 473 proof obligations in TZ_Sys is 78%. Then, the remaining proof obligations are interactively proved to ensure the internal consistency of the abstract machine in the specification initialization, reasoning and refinement implementation stages. If there is an unprovable proof obligation, tracing back is performed to analyze whether there is a certain operation that does not meet the given security specifications.

Step 4: the access control model is loaded into ProB for model checking, the state space is explored by adopting the Mixed DF/BF algorithm for the smaller TZTZ_Proc and TZ_Res abstract machines, and the breadth-first-search is adopted for the larger TZ_Policy and TZ_Sys abstract machines to ensure that all operations are covered. Table 1 shows the model checking results of the access control model. More independent states and state transitions indicates more corresponding abstract sets in the abstract machine.

TABLE 1

Model test results of the access control model

| Abstract Machine | Number of Independent States | Total Number of Transitions |
| --- | --- | --- |
| TZ_Proc | 6562 | 170409 |
| TZ_Res | 362 | 1595 |
| TZ_Policy | 2782 | 10682 |
| TZ_Sys | 208704 | 1111553 |

Figure 2:
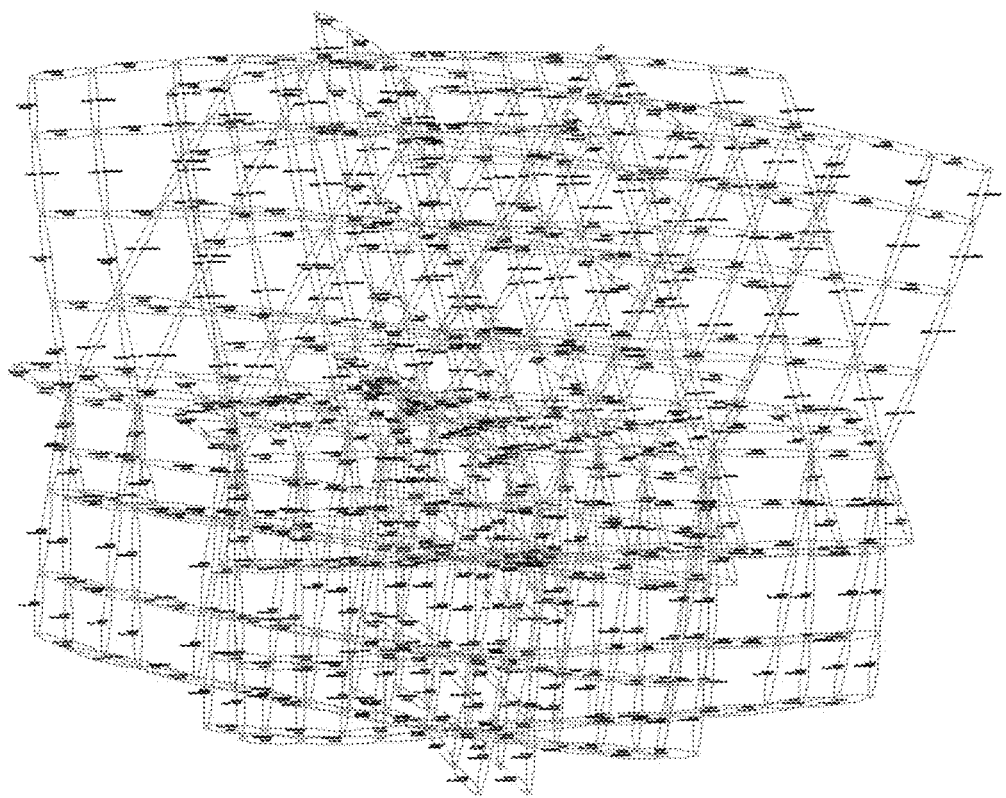
FIG. 2 is a state space diagram demonstrating model checking the TZ_Res abstract machine in a preferred example.
Figure 3:
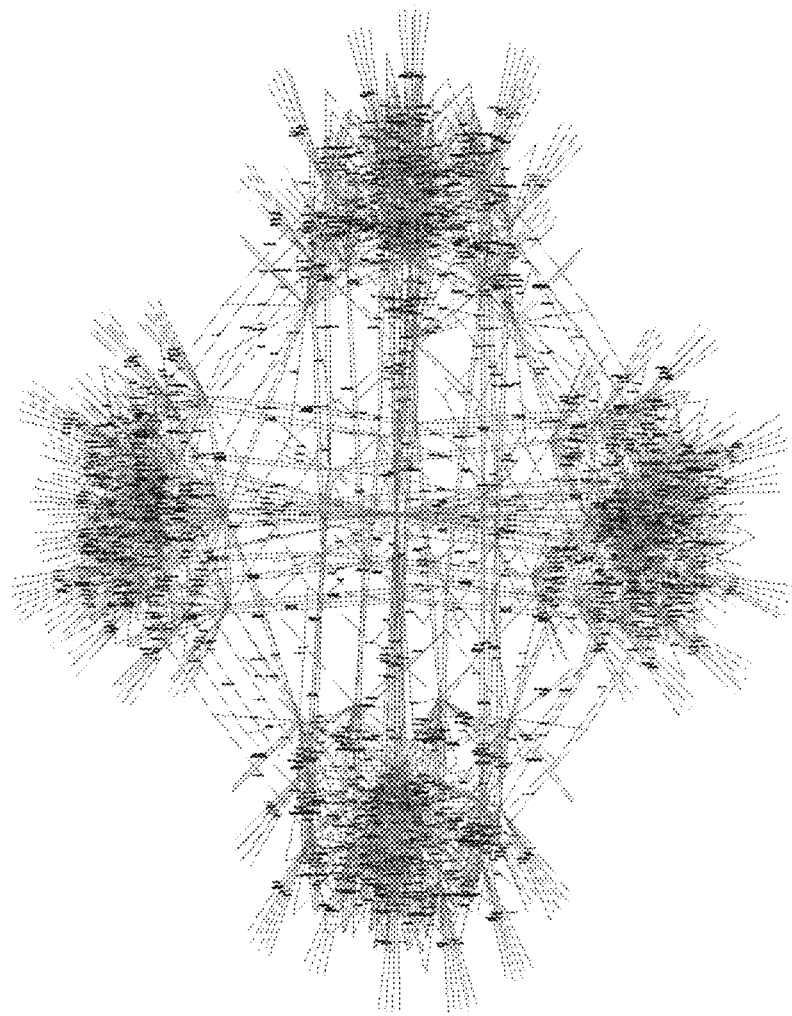
FIG. 3 is part of the state space diagram demonstrating model checking the TZ_Policy abstract machine in a preferred example.
Figure 4:
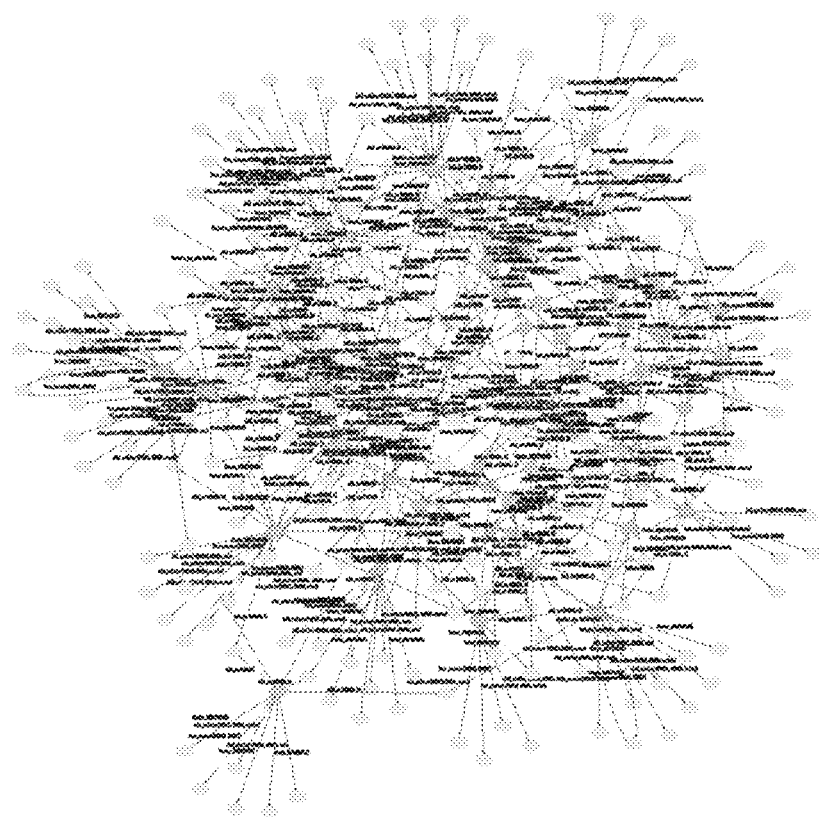
FIG. 4 is part of the state space diagram demonstrating model checking the TZ_Sys abstract machine in a preferred example.

FIG. 2 shows the complete state space of TZ_Res, consisting of 362 states and 1595 transitions. All independent states displayed as green nodes have been checked completely. FIG. 3 shows TZ_Policy with 1084 independent states and 3382 transitions. The model here mainly simulates the access scenarios of two processes and two resources, there are four centrally symmetric clusters of dense nodes. FIG. 4 shows part of the state space of TZ_Sys, with 298 independent states and 590 transitions. The model has many variables, and the transition between nodes is the most complicated because of the access of breadth traversal and world switching. The checking result shows whether there is any invariant violation.

Step 5: based on the above results, a typical privilege escalation attack scenario is simulated in the model and a specific analysis is performed. Thus, security risks and vulnerabilities of the access control mechanism is discovered. Specifically, the defense performance of the model against attacks is verified by setting different variables and determining whether the access operations is enabled, and whether there are invariants and pre-condition conflicts.

Domain professionals can understand that the above is only a preferred example of the present disclosure, and the present disclosure is not limited to this scenario. Although the present disclosure has been described in detail with reference to the aforementioned examples, domain professionals can just modify the method described in the aforementioned examples, such as replacing some of the technical features according to their own requirements and implementation strategies. Within the spirit and principle of the invention, all modifications, equivalent substitutions, etc. shall be included in the scope of protection of the invention.

What is claimed is:

1. A method for discovering vulnerability of access control of an operating system based on model checking, applied in an Advanced RISC Machines (ARM)-Android access control vulnerability discovery process based on model checking and executed by a computer, the computer comprises:
- at least one processor, and
- a memory configured to store instructions executable by the at least one processor;
- wherein the instructions cause the at least one processor to:
- Step 1: analyzing an access control mechanism of an ARM platform based on TrustZone hardware isolation, and formalizing access control rules and security attributes to describe a security attribute specification, and providing a security specification by analyzing program semantics and system dynamic behaviors, to describe a specification of operating system access control;
- wherein the security attributes comprise atomic security attributes and resource security attributes, and the atomic security attributes comprise privilege definition, access location and user type; and the resource security attributes comprise subject security attributes and object security attributes;
- Step 2: analyzing the specification of the operating system access control, defining three basic elements, wherein the three basic elements comprises processes, resources and access control files, constructing corresponding three basic abstract machines TrustZone (TZ) Proc, TZ Res and TZ Policy, determining static and dynamic properties, formally describing processes' access to the resources, establishing and refining an access control model TZ Sys closer to reality based on the corresponding three basic abstract machines TZ Proc, TZ Res and TZ Policy;
- Step 3: using a theorem proving tool Atelier B to automatically or interactively prove proof obligations of the access control model to ensure an internal consistency of the abstract machines in a specification initialization, reasoning and refinement implementation stages, to analyze a security of the access control model based on proof results;
- Step 4: aiming at possible access rule conflicts in the security specification of the access control model, loading the access control model into a model checking tool ProB for model checking, choosing reasonable verification methods and rules of the model checking tool ProB to perform state space exploration or fixed point calculation, exploring a state space by adopting a Mixed DF/BF algorithm for abstract machines TZ Proc and TZ Res, adopting breadth-first-search for abstract machines TZ Policy and TZ Sys to ensure that all operations are covered, and checking whether there is any invariant violation;
- Step 5: based on the security analysis of the access control model in Step 3 and model checking results in Step 4, simulating an actual attack scenario, and detecting security risks and vulnerabilities of access control.

2. The method of claim 1, wherein the proof obligations of the access control model are proved interactively in Step 3 using the theorem proving tool Atelier B as follows: a connection between an abstract mathematical structure and a concrete computer representation is established, a relation between the abstract specifications and refined specifications is established, and different proof strategies are used to prove them.

3. The method of claim 1, wherein the static and dynamic properties in Step 2 comprise consistency, integrity and state change properties at runtime.

* * * * *